United States Patent [19]
Sebben et al.

[11] Patent Number: 5,136,829
[45] Date of Patent: Aug. 11, 1992

[54] MOWER DECK DEPTH GAUGE ATTACHMENT

[75] Inventors: Daniel A. Sebben, West Bend; Richard D. Teal, Horicon, both of Wis.

[73] Assignee: Deere & Company, Moline, Ill.

[21] Appl. No.: 715,947

[22] Filed: Jun. 14, 1991

[51] Int. Cl.$^5$ .............................................. A01D 34/74
[52] U.S. Cl. .................................. 56/17.2; 56/DIG. 9
[58] Field of Search ....................... 56/17.1, 17.2, 208, 56/214, DIG. 9, DIG. 10; 108/106, 107, 144

[56] References Cited

U.S. PATENT DOCUMENTS

| | | | |
|---|---|---|---|
| D. 271,398 | 11/1983 | McCanse et al. | D15/27 |
| 2,732,675 | 1/1956 | Smith et al. | 56/13.6 X |
| 3,222,802 | 12/1965 | Kiernan | 37/43 |
| 3,526,083 | 12/1967 | Barry et al. | 56/25.4 |
| 3,839,919 | 10/1974 | Mollen et al. | 74/194 |
| 4,085,570 | 4/1978 | Joray et al. | 56/2 |
| 4,441,266 | 4/1984 | Westimayer | 37/244 |
| 4,878,339 | 11/1989 | Marier et al. | 56/14.7 |
| 4,901,507 | 2/1990 | Cracraft | 56/6 |
| 4,901,508 | 2/1990 | Whatley | 56/10.4 |

FOREIGN PATENT DOCUMENTS

| | | | |
|---|---|---|---|
| 301360 | 9/1954 | Switzerland | 56/17.2 |
| 1515854 | 6/1978 | United Kingdom | 56/17.2 |

OTHER PUBLICATIONS

Deere & Company, John Deere Parts Catalog, p. 84-14 for a mower deck, published Jan. 1989 in U.S.A.
Kubota Tractor Corporation, tractor literature, one page, from the magazine, *Organic Gardening* 1991 *Buyer's Guide*, p. 5A.
Leon Mfg. Co. Ltd., brochure, 4 pages, published 1984 in Canada.

*Primary Examiner*—David J. Bagnell

[57] ABSTRACT

An adjustable depth gauge attachment is provided for use with implements, such as rotary mowers and other vegetation cutting apparatus. The depth gauge takes the form of a hemispherically-shaped skid element carried on an adjustable leg. The gauge is optionally carried by a bracket which can be mounted to a mower deck as an aftermarket addition. The hemispherical skid element serves to provide skidding depth gauging, as well as minimize scalping when uneven terrain is encountered.

5 Claims, 3 Drawing Sheets

MOWER DECK DEPTH GAUGE ATTACHMENT

BACKGROUND OF THE INVENTION

1. Field of the Invention

The present invention relates to mowers for cutting grass and similar vegetation and more particularly to a depth gauge means which is attachable to the housing of such mowers.

2. Description of the Related Art

Vegetation cutters, such as rotary mowers, typically include housings with a blade mounted therein for the cutting of vegetation. The housing can be supported by a vehicle which moves it across the ground or on ground support structures, such as wheels and/or skids. Such support structures are designed to regulate the height above the ground at which the cutting blade operates and thereby control the amount of vegetation which is cut and/or the height of the vegetation left uncut.

Depth gauging means, such as wheels and/or skids are typically attached to the circumference of the housing and in some cases are adjustable individually or in concert. These devices not only control the quality of the cut, but are also designed to minimize the amount of scalping which occurs as the mower housing moves over uneven ground.

Adjustable wheel depth gauge mechanisms generally work well but can be expensive to manufacture. Fixed skids, while not generally being adjustable, work at their set height but not through a range of height options as may be desirable. Further, such skids have a tendency to tear up the turf or grass over which they are operating, particularly as the housing is moved in various directions. Further, such depth gauging devices must generally be installed during manufacture of the mower.

Accordingly, it would be desirable to provide a reliable mower deck or housing depth gauge mechanism which is reasonably inexpensive to manufacture and install, which is adjustable and which has a minimum tendency to result in scalping of the vegetation being cut. Further, it would be desirable to provide such a depth gauge mechanism which could be provided as an aftermarket option that could be quickly attached to a mower deck with a minimum of tools. It would also be desirable to provide such a depth gauge structure which, when not installed on the housing at the factory, would not provide an unsightly appearance suggesting that a part is missing from the mower housing. Such a depth gauge mechanism, when provided as an aftermarket option, should further be simple to install by the mower purchaser.

SUMMARY OF THE INVENTION

Accordingly, there is provided herein a composite deck and depth gauge device which utilizes the advantages of the adjustable depth gauge wheel and the skid through providing an adjustable skid mechanism. The plastic skid mechanism takes the form of a hemispherically-shaped skid portion carried at the end of a leg member which is adjustable within a bracket mounted on the mower deck housing.

The hemispherical end of the skid is provided to reduce the likelihood that the turf or grass will be torn up as the deck moves in various directions and the single piece adjustable depth gauge member reduces the number of pieces which must be manufactured compared to a wheel depth gauge which includes the wheel, the bearing support and associated parts.

To provide the depth gauge means as an option for aftermarket installation, the plastic mower deck is provided with bracket attaching structure which is subdued when no factory installed depth gauge is attached, but which permits the depth gauge bracket to be easily and quickly attached after purchase with a minimum number of tools. The attaching structure is provided at the edge of the housing or deck and includes a pair of horizontally spaced apart and vertically extending recesses. The recesses have thin knockout closures formed at their top end and provide a smooth finished look to the deck when the depth gauge option is not installed at the factory. The closures are easily removed to permit the installation of a depth gauge bracket with complementarily positioned openings. The openings in the bracket are then alignable with the recesses or openings in the deck and bolt means are used to provide a quick and simple means of mounting the bracket to the deck. Reducing the requirement for tools is a pin means and cotter key which are insertable through the leg of the skid and an opening in the bracket to secure the skid at a one of a selected plurality of height adjustment positions.

The present mower deck depth gauge structure permits the manufacture of a pleasant looking deck which does not suggest that parts are missing and permits easy knockout of the closures to allow attachment of the optional bracket and skid. The depth gauge support bracket is easily and quickly installed on the deck and includes structure to allow the skid member to be vertically adjusted. The hemispherical skid portion serves to reduce the amount of scalping or tearing of the turf as the mower deck is moved in various directions.

With the present invention, a reliable, inexpensive, attractive and easily installed depth gauge structure is provided which can either be installed as the mower is manufactured or can be made available to the purchaser as an aftermarket option.

DESCRIPTION OF THE PREFERRED EMBODIMENT

Figure 1:
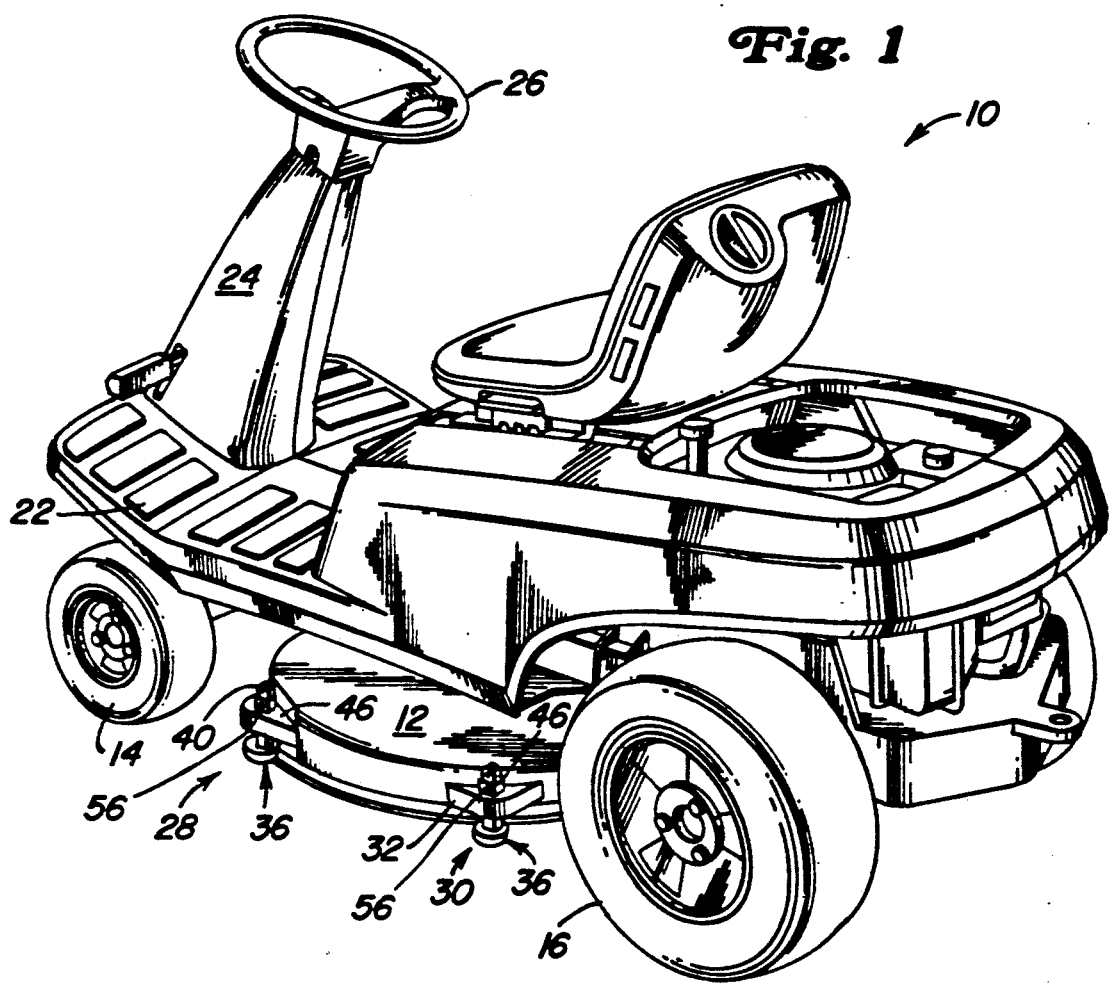
FIG. 1 is a rear elevated perspective view of a lawn and garden tractor equipped with a mower deck having the depth gauging means of the present invention installed thereon.

Looking first to FIG. 1, there is illustrated a lawn and garden tractor 10 having a belly mounted mower deck or housing 12 carried between the front and rear wheels 14 and 16. The vehicle 10 includes a seat 18 for the operator, an engine 20, front foot rest area 22, and an upstanding column 24 with a steering wheel 26.

The mower deck or housing 12 includes a vegetation cutting blade carried therebeneath (not shown) and depth gauge means 28 and 30 carried at the front and rear sides of the housing 12 for controlling the depth of cut and preventing scalping. The front gauge means 28 in the preferred embodiment can be added during manufacture or as an aftermarket option by the purchaser to provide an enhanced ability to control depth of cut and minimize scalping of the grass or vegetation being cut.

Figure 2:
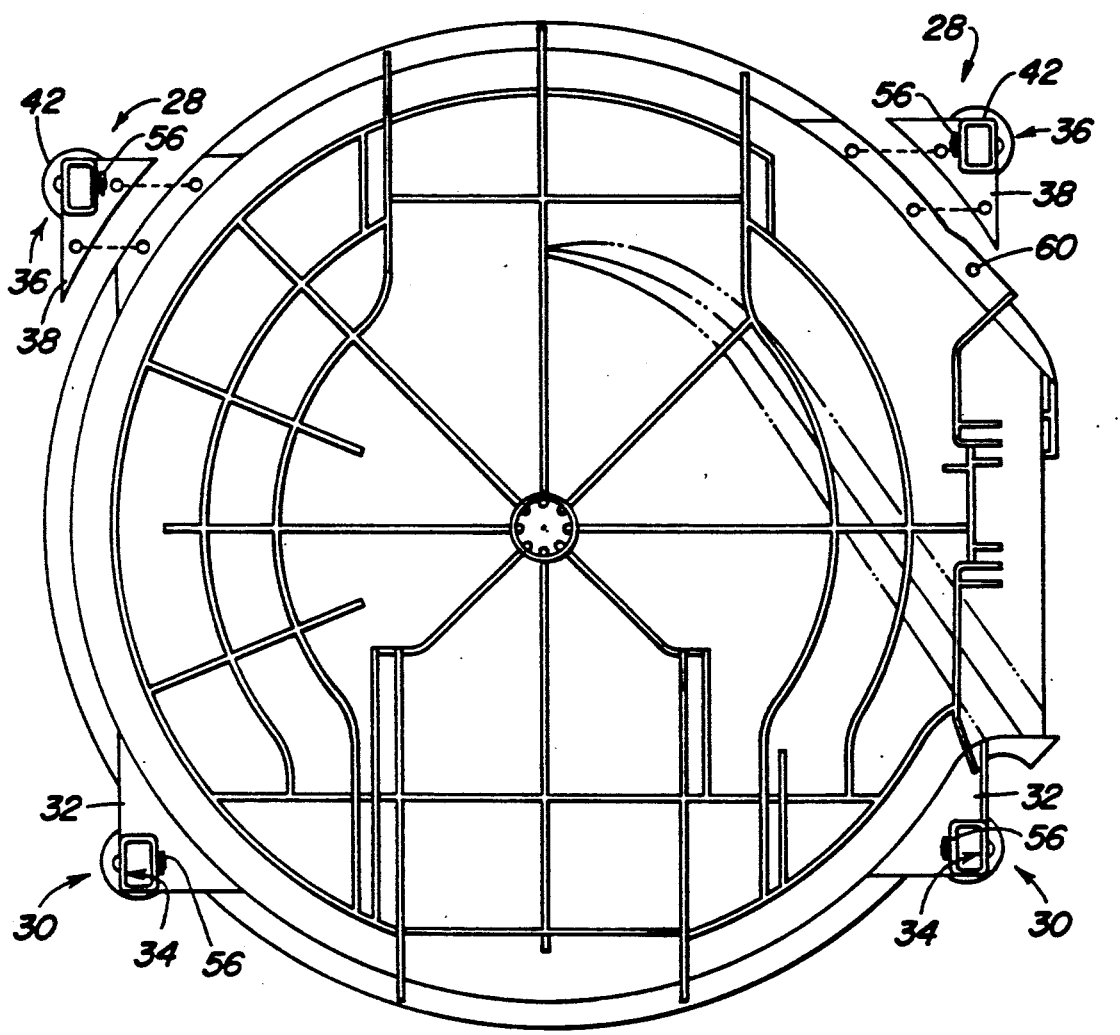
FIG. 2 is a plan view of a mower deck housing equipped with the depth gauging means provided at the rear of the deck and the optional mounting bracket and depth gauging means provided at the front edge of the deck.

As illustrated in FIG. 2, the mower deck 12 would include mounting brackets 32 which are formed as part of the composite or plastic deck 12 at the rear edges of the housing 12. These brackets 32 include upstanding slots 34 within which the depth gauging element or member 36 is vertically and slidably housed.

Figure 3:
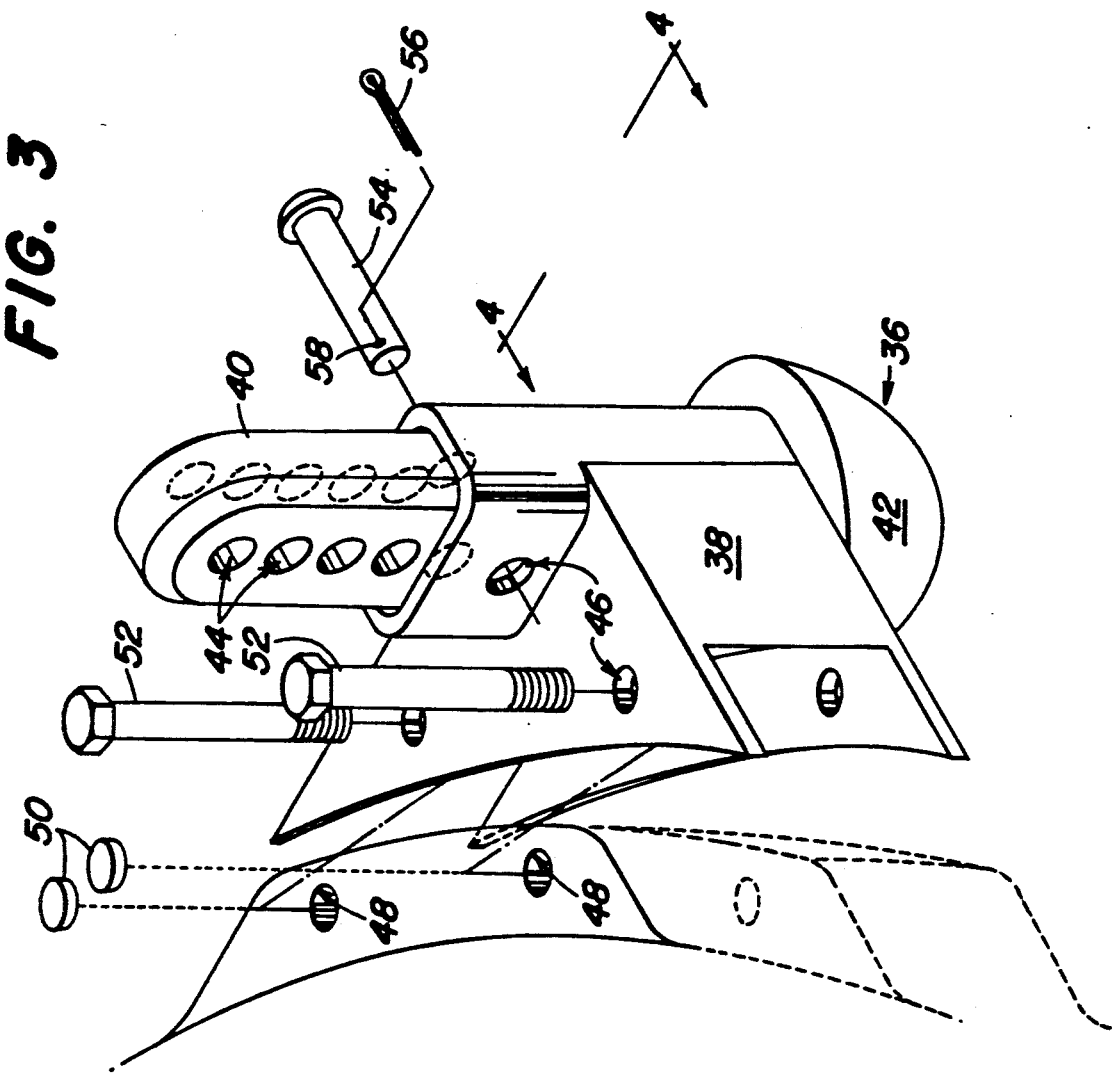
FIG. 3 is an enlarged partially exploded perspective view of the depth gauging means and the optional bracket attaching means which would be assembled to the deck.
Figure 4:
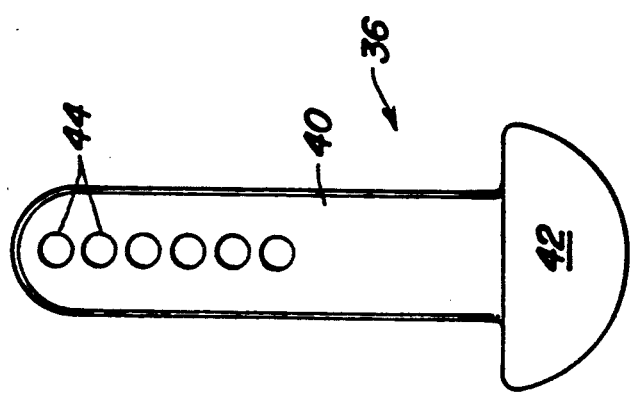
FIG. 4 is a view of the skid depth gauging element taken along lines 4—4 of FIG. 3.

Turning to FIG. 3, there is illustrated an enlarged partial view of the detachable bracket 38 and depth gauging element 36 which can be installed on the front of the mower deck 12. The element 36 includes an upstanding leg 40 and a hemispherical lower portion 42 adapted for skidding engagement with the ground. While a generally hemispherically-shaped element is preferred for the lower end of the depth gauging element 36, a surface configuration adapted to skiddingly contact the ground as the deck moves in a variety of directions would be acceptable. For example, the end portion need not be perfectly hemispherical but rounded sufficiently to provide such skidding action. The upstanding leg 40 has a plurality of vertically spaced horizontally opening holes 44 passing therethrough which are alignable with an opening 46 in the bracket 32 or 38 for positioning the skid member 36 in a variety of vertically spaced positions.

Returning to FIG. 2, there is shown in spaced apart relation to the deck 12, the optional bracket 38 and depth gauge element 36 which can be added to the deck 12 subsequent to its manufacture or in the assembly stage at the factory. This bracket 38 is adapted to be mounted on the edge of the mower deck 12 and to have the bracket openings 46 alignable with the openings 48 in the mower deck 12. The openings 48 in the composite mower deck 12 would have closure elements 50 formed into the top portion thereof which could be easily knocked out if an aftermarket addition of the bracket 38 to the mower deck 12 were desired.

The bracket 38 is designed to be positioned on the deck 12 with the openings 46 aligned with the openings 48 in the deck 12. These openings 46 and 48 could then receive the bolts 52 or similar fastening means, such as a pin and cotter key, to secure the bracket 38 to the deck 12. The use of a pin and cotter key could minimize overtorquing of a bolt and nut fastening means, which could pose problems with the use of a plastic and deck end bracket. Adjustment of the depth gauge element 36 is easily achieved through removing the pin 54 and sliding the element 36 to the desired elevation relative to the mower housing 12, then reinserting the pin 54 with a cotter key 56 or similar element passing through the opening 58 in the pin 54.

In operation, the depth gauge element 36 can be adjustably set at the desired height relative to the mower deck 12 to skiddingly engage the ground and prevent the mower deck 12 from scalping or cutting vegetation too closely as it encounters ground irregularities. The element 36 can also be adjusted to serve as a depth of cut gauge whereby the gauge elements 36 ride on the ground and maintain the cut height.

The hemispherical portion 42 of the depth gauge element 36 is configured to provide a more reliable skidding-type of contact with uneven ground.

Additionally provided to one side of the deck 12 at its forward edge is a hole 60 wherein a bracket can be mounted to aid in supporting a discharge duct designed to carry grass away from the mower housing 12 and into a bagging structure. This opening is provided to serve as a support in the composite or plastic deck housing and could be also used for other mounting purposes.

We claim:

1. Depth gauge means for a vegetation cutting means usable with a generally horizontal housing having a first pair of horizontally spaced apart generally vertical openings with removable closures receivable in one end thereof; said gauge means including bracket means with a pair of third openings alignable with the first openings in said housing when said closures have been removed; means receivable in said first and second openings when aligned for securing the bracket means to the housing including an upstanding leg portion mountable in said bracket means and adapted to be vertically adjusted; and a generally hemispherical skid portion carried by the leg portion, said skid portion projecting beneath the housing and operating to gauge the depth of cut of said vegetation cutting means.

2. The invention defined in claim 1 wherein the housing and depth gauge means are plastic.

3. Means for attaching a depth gauge means to a housing for regulating the height of said housing above the ground comprising:

a pair of vertically spaced apart and generally vertical recesses formed in one portion of said housing;

closure means carried at one end of said recesses, the closure means being removable whereby the recesses become vertical openings through said housing portion;

depth gauge bracket means having a pair of openings registrable with said vertical openings in said housing; and means for maintaining the housing and bracket means openings in registry.

4. The invention defined in claim 3 wherein the closure means are carried at the top portion of said recesses.

5. The invention defined in claim 5 wherein the depth gauge means includes an upstanding leg portion carried by the bracket means and being vertically adjustable therein, with a generally hemispherical skid portion carried by the leg portion, the skid portion projecting beneath the housing.

* * * * *

UNITED STATES PATENT AND TRADEMARK OFFICE
CERTIFICATE OF CORRECTION

PATENT NO. : 5,136,829

DATED : 11 August 1992

INVENTOR(S) : Daniel A. Sebben et al.

It is certified that error appears in the above-identified patent and that said Letters Patent is hereby corrected as shown below:

Column 4, line 54, after "claim", delete "5" and insert therefore -- 3 --.

Signed and Sealed this

Ninth Day of November, 1993

*Attest:*

BRUCE LEHMAN

*Attesting Officer*     *Commissioner of Patents and Trademarks*